US010191818B2

(12) United States Patent
Boshev et al.

(10) Patent No.: US 10,191,818 B2
(45) Date of Patent: Jan. 29, 2019

(54) FILTERED REPLICATION OF DATA IN DISTRIBUTED SYSTEM OF DATA CENTERS

(71) Applicant: SAP SE, Walldorf (DE)

(72) Inventors: Stoyan Boshev, Sofia (BG); Marc Wirth, Weinheim (DE)

(73) Assignee: SAP SE, Walldorf (DE)

( * ) Notice: Subject to any disclaimer, the term of this patent is extended or adjusted under 35 U.S.C. 154(b) by 40 days.

(21) Appl. No.: 15/350,110

(22) Filed: Nov. 14, 2016

(65) Prior Publication Data
US 2018/0137015 A1 May 17, 2018

(51) Int. Cl.
*H04L 9/00* (2006.01)
*G06F 11/14* (2006.01)
*G06F 17/30* (2006.01)
*G06F 21/60* (2013.01)
*H04L 29/06* (2006.01)

(52) U.S. Cl.
CPC .... *G06F 11/1464* (2013.01); *G06F 17/30575* (2013.01); *G06F 21/602* (2013.01); *H04L 63/0428* (2013.01)

(58) Field of Classification Search
CPC ........... G06F 11/1464; G06F 17/30575; G06F 21/602; H04L 63/0428
USPC ........................................................ 713/154
See application file for complete search history.

(56) References Cited

U.S. PATENT DOCUMENTS

| 6,697,960 | B1 * | 2/2004 | Clark | G06F 11/1469 714/15 |
|---|---|---|---|---|
| 7,643,468 | B1 * | 1/2010 | Arregoces | H04L 12/462 370/351 |
| 9,087,012 | B1 * | 7/2015 | Hayes | G06F 11/2069 713/163 |
| 2005/0288961 | A1 * | 12/2005 | Tabrizi | G06Q 10/00 717/126 |
| 2008/0263363 | A1 * | 10/2008 | Jueneman | G06F 21/32 713/184 |
| 2010/0318782 | A1 * | 12/2010 | Auradkar | G06F 11/1451 713/150 |
| 2010/0318812 | A1 * | 12/2010 | Auradkar | G06F 11/1464 713/193 |
| 2011/0145593 | A1 * | 6/2011 | Auradkar | G06F 21/6218 713/189 |
| 2011/0154023 | A1 * | 6/2011 | Smith | G06F 21/78 713/155 |
| 2014/0093084 | A1 * | 4/2014 | De Atley | H04L 9/0861 380/277 |
| 2014/0108786 | A1 * | 4/2014 | Kreft | G06F 21/71 713/156 |
| 2014/0236891 | A1 * | 8/2014 | Talius | G06F 11/00 707/613 |

(Continued)

*Primary Examiner* — Haresh N Patel
(74) *Attorney, Agent, or Firm* — Buckley, Maschoff & Talwalkar LLC

(57) ABSTRACT

Various embodiments of systems, computer program products, and methods to replicate data in a distributed environment are described herein. In an aspect, the data from a first persistent storage unit associated with a primary data center is received. Further, at least a part of the received data is determined to be replicated by filtering the data based on one or more predetermined conditions. The determined part of the data is transmitted to replicate in a second persistent storage unit associated with a secondary data center to recover the part of the data during failure of the primary data center.

14 Claims, 5 Drawing Sheets

(56) References Cited

U.S. PATENT DOCUMENTS

| | | | |
|---|---|---|---|
| 2015/0096011 A1* | 4/2015 | Watt | H04L 63/0272 726/15 |
| 2015/0180894 A1* | 6/2015 | Sadovsky | G06F 3/0481 726/22 |
| 2016/0004877 A1* | 1/2016 | Hayes | G06F 21/6218 713/165 |
| 2016/0203060 A1* | 7/2016 | Singh | G06F 11/1469 714/19 |
| 2016/0306719 A1* | 10/2016 | Laicher | G06F 11/203 713/165 |
| 2017/0116100 A1* | 4/2017 | Hayes | G06F 11/2094 713/163 |

* cited by examiner

FILTERED REPLICATION OF DATA IN DISTRIBUTED SYSTEM OF DATA CENTERS

BACKGROUND

Database systems are commonly employed by organizations to store data. Accordingly, the database systems may have to be reliable and scalable. For reliability, in a distributed environments, the stored data may be replicated from a primary data center to a secondary data center. The secondary data center can replace the primary data center without data loss upon unavailability of the primary data center. When the data is updated at the primary data center, the secondary data center is updated to reflect the changes to the data. However, replicating data such as the data specific to the primary data center, data which can be rebuild and the like may not be useful and such process may only increase network traffic and overload the secondary data center.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to replicate data in distributed environments are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted. Further, it is to be understood that the various actions (retrieving, determining, generating, rendering, and so on) may be performed by a hardware device (e.g., computing system), even if the action may be authorized, initiated or triggered by a user, or even if the hardware device is controlled by a computer program, software, firmware, and the like.

Figure 1:
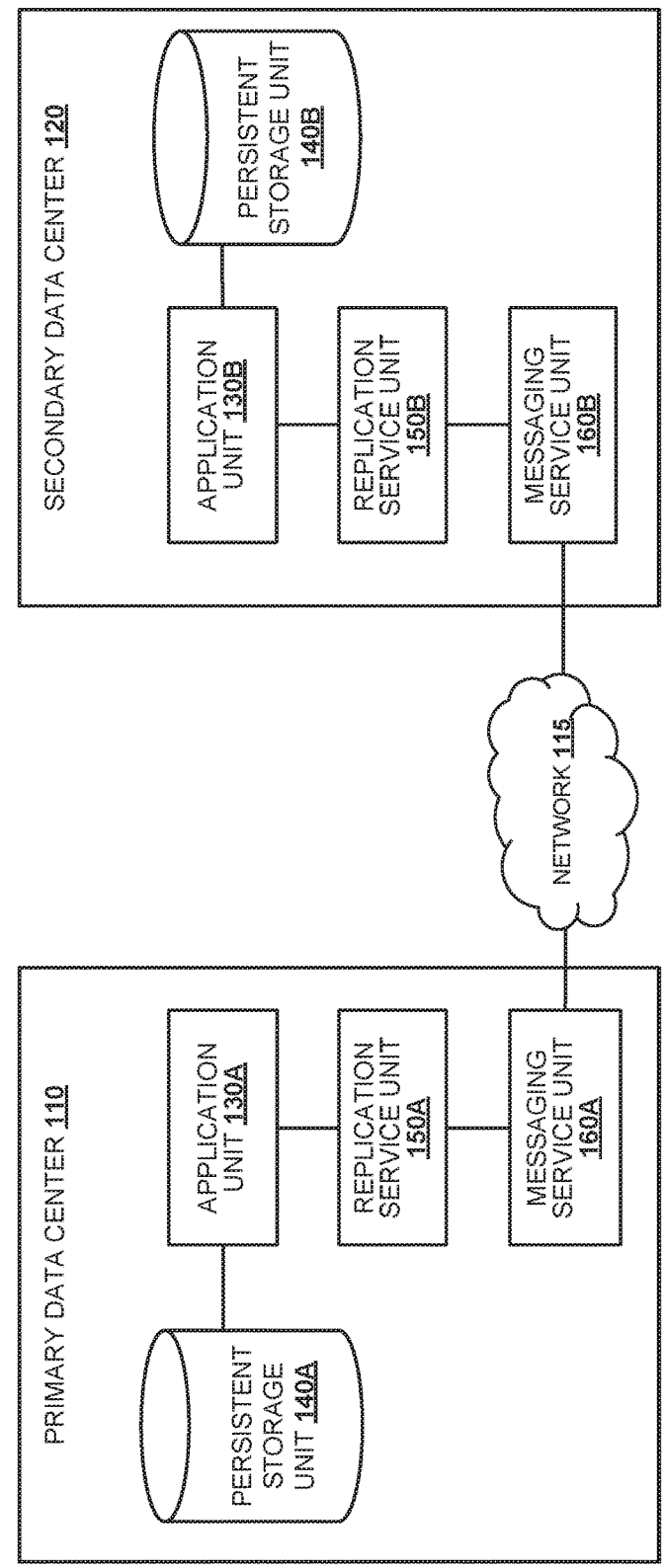
FIG. 1 is a block diagram of a computing environment illustrating replication of data in a distributed environment, according to one embodiment.

FIG. 1 is a block diagram of a computing environment illustrating replication of data in distributed environment 100, according to one embodiment. The distributed environment 100 may include a primary data center 110 and one or more secondary data centers (e.g., secondary data center 120) connected through network 115 (e.g., Internet). In one example, either the primary data center 110 or the secondary data center 120, or both, may be built, hosted and delivered through a cloud computing platform over the Internet. Further, there is no geographic restriction for the primary data center 110 and the secondary data center 120. In an exemplar configuration, the primary data center 110 may reside in Germany and the secondary data center 120 may reside in India. The network 115 connecting the primary data center 110 and the secondary data center 120 can be any network or combination of wired and wireless networks that carry data communication. Such networks can include, but are not limited to, local area network, medium area network, and/or wide area network, such as the Internet.

The primary data center 110 may include a number of application units (e.g., application unit 130A) to host one or more client applications. An example of a client application can be, but not limited to, a database application and a server-side application. The database application can be a computer program with primary purpose to enter and retrieve information from a computerized data storage (e.g., persistent storage unit 140A) and to facilitate updates and queries from multiple client applications. The server-side application may include operations performed by a server in a client-server relationship. The persistent storage unit 140A can be, but not limited to a database, network volume and a file system for storage, management, and dissemination of the data. Further, the data can be, but not limited to application data, business data, system data and security relevant data.

In one embodiment, the primary data center 110 may include replication service unit 150A configured to trigger the application unit 130A to export the data from the persistent storage unit 140A at regular time intervals. Further, the application unit 130A checks whether any modifications to the data are applied in the persistent storage unit 140A, e.g., since the last check. When there is such a modification of data, the application unit 130A transfers the modified data to the replication service unit 150A.

In one embodiment, the replication service unit 150A determines at least a part of the data to be replicated. To determine the part of the data to be replicated, the replication service unit 150A filters the data based on predetermined conditions. For example, the predetermined conditions can include, but are not limited to data specific to the primary data center 110, data which can be recreated, quotas associated with clients in the primary data center 110. Therefore, the data specific to the primary data center 110, the data which can be recreated and like are filtered out before replicating the data in the secondary data center 120. In one embodiment, the replication service unit 150A can be a separate unit or module, or alternatively, the replication service unit 150A may be a part of the application unit 130A.

Further, the replication service unit 150A may encrypt the part of the data and transmit the encrypted data to replication service unit 150B in the secondary data center 120 via messaging service unit 160A. For example, the messaging service unit 160A may use different messaging solutions such as, but not limited to, Java® Messaging Service (JMS®). Messages including the encrypted data are received by replication service unit 150B associated with the secondary data center 120 via messaging service unit 160B. In one example, the messaging service unit 160A and the messaging service unit 160B may represent a transport mechanism for inter-landscape communication (e.g., communication between the primary data center 110 and the secondary data center 120).

In one embodiment, the messaging service unit 160A and the messaging service unit 160B provide application programming interfaces (API) to send/receive the encrypted data to/from the different data centers or landscapes (e.g., the primary data center 110 and the secondary data center 120). In one exemplar configuration, the replication service unit 150A in the primary data center 110 may communicate directly with the replication service unit 150B in the secondary data center 120.

In one embodiment, the secondary data center 120 may include the replication service unit 150B configured to import the encrypted data. Therefore, the replication service unit 150B can read the incoming encrypted data. Upon decrypting the data, the data is stored in persistent storage unit 140B associated with the secondary data center 120. e.g., via application unit 130B. Further, some data may need to be adjusted or modified when it is replicated. In one embodiment, the replication service unit 150B (and/or the application unit 130B) may adjust/modify the decrypted data specific to the secondary data center 120 before storing the data.

Accordingly, instead of replicating all the data from the primary data center to the secondary data center, only relevant data is replicated. The relevant data may include the data that was changed since the last check. Also, the data is identified as the relevant data upon filtering out of the datacenter specific data and/or the data that can be recreated. Thus, optimizing resources associated with replicating the data can be achieved and overloading the secondary data center with irrelevant data can be avoided.

Figure 2:
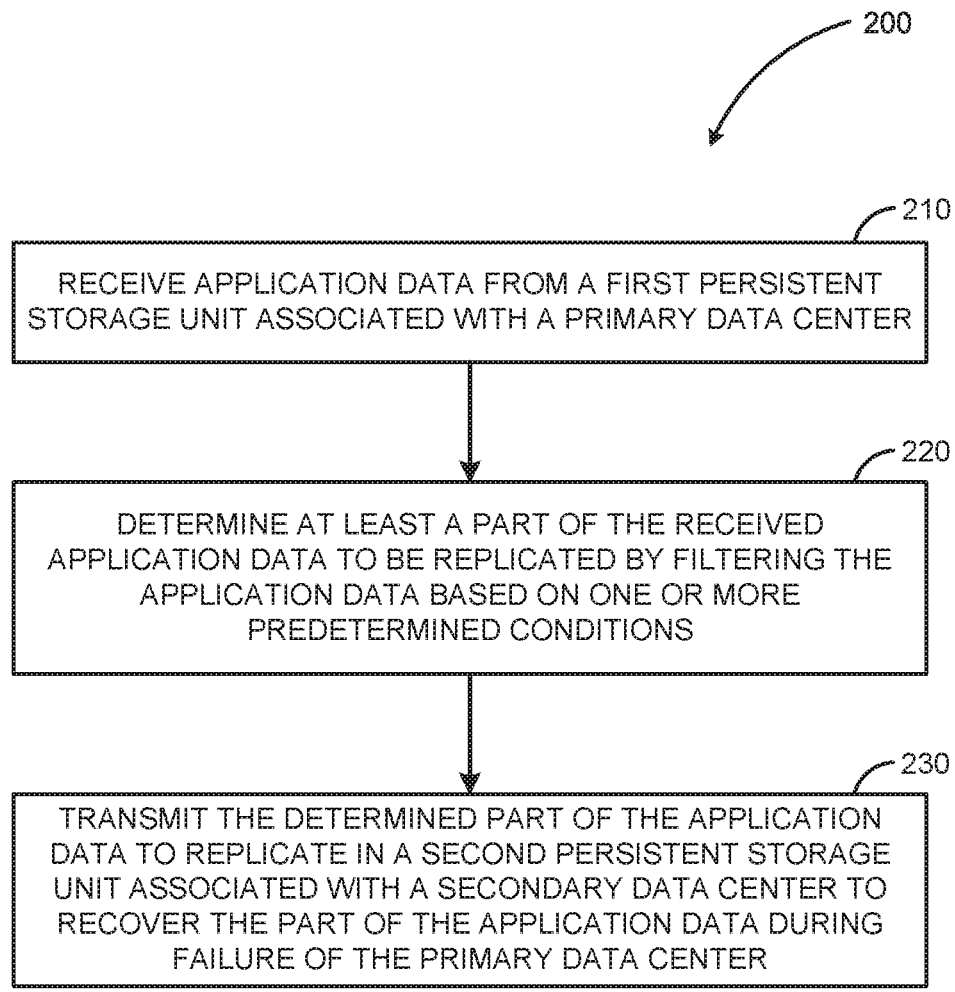
FIG. 2 is a flow diagram illustrating an example process to replicate data in a distributed environment, according to an embodiment.

FIG. 2 is a flow diagram illustrating example process 200 to replicate data in a distributed environment, according to an embodiment. The process 200 illustrates replication of the data in a first persistent storage unit associated with a primary data center to a second persistent storage unit associated with a secondary data center. In one example, the secondary data center is in a different geographical location than the primary data center. Therefore, in case a disaster strikes the primary data center, the data in the secondary data center can be used by users. In one embodiment, a first replication service unit associated with the primary data center determines a part of the data to be replicated to avoid unnecessary burden on the second persistent storage unit by storing unnecessary data.

At 210, the data is received from the first persistent storage unit associated with the primary data center. For example, the data is received by the first replication service unit. The primary data center includes a first application unit running in a cloud platform. Further, the first application unit may be associated with the first persistent storage unit to store the data. In one example, receiving the data by the first replication service unit associated with the primary data center includes determining any modification in the data of the first persistent storage unit at regular time intervals. Upon determining modification in the data in the first persistent storage unit, the data is received. For example, the first application unit checks time stamp of the last modification of the data (e.g., the data may be account metadata, and the time stamp for the account may be stored in a database table and shows when the specific account metadata was last modified). When the time stamp shows that the data was modified after the last check, the data is subject for replication. In one embodiment, the first application unit may be configured to add and maintain the time stamps for the data that is stored in the first persistent storage unit. Further, the time stamps can be part of the data and/or can be stored separately.

For example, the first replication service unit calls on regular intervals of time an application program interface (API) provided by the first application unit to check whether there is modified data since the last time the first persistent storage unit is checked. When the data is modified since the last check, the first application unit returns the data in a data-interchange format such as, but not limited to, JavaScript Object Notation (JSON). When there is no data modified, the response of the API specifically return a statement that the data is not modified (e.g. empty JSON). In one example, the first application unit keep track of when the changes or modifications have occurred to the data in the first persistent storage unit.

At 220, at least a part of the received data to be replicated is determined by filtering the data based on one or more predetermined conditions. The predetermined conditions define relevant data to be replicated. For example, the conditions may include filtering out the data specific to the primary data center (e.g., the data not relevant to other landscapes or data centers) and filtering out the data which can be restored (e.g., the data which can be rebuilt if required) from replication.

Examples for the data specific to the primary data center may include, but not limited to, collected metrics (e.g., performance statistics, availability, resource consumption) of the first application unit associated with the primary data center, configurations (e.g., destinations) data for connection to platform provided services and configurations for account resource quotas. The collected metrics may be specific and relevant for the first application unit in the primary data center, and may not be useful and relevant to a second application unit associated with in the secondary data center. The configurations data may be specific for the primary data center as they contain Uniform Resource Locator (URL) of the platform service relevant for the primary data center. The configurations for account resource quotas can be different for the different data centers according to how the customer has distributed them. Examples for the data which can be, recreated or rebuilt can be, but not limited to, binaries of applications (e.g., if they can be redeployed or downloaded or recompiled) and cached data (e.g., the cache can be regenerated).

At 230, the determined part of the data is transmitted to replicate in a second persistent storage unit associated with a secondary data center to recover the part of the data during failure of the primary data center. Before transmitting the determined part of the data, the determined part of the data is encrypted for security reasons. Therefore, the replication service unit in the primary data center filters, encrypts and transmits the encrypted data to the second replication service unit via a first messaging service unit associated with the primary data center. For example, the first messaging service unit provides Java Messaging Service (JMS) API for transmitting the part of the data. Further, the first messaging service transmits messages containing the encrypted data to a target queue in the secondary data center via a second messaging service associated with the secondary data center.

In one embodiment, the second replication service unit in the secondary data center receives the encrypted part of the data to be replicated via the second messaging service unit. For example, the second replication service unit is configured to read messages including the encrypted part of the data from the queue. Further, the encrypted part of the data is decrypted by the second replication service unit. Upon decrypting the encrypted part of the data, the decrypted part of the data is stored in the second persistent storage unit. For example, the second replication service unit calls API of a second application unit associated with the secondary data center to import the decrypted data. Further, the second application unit stores the decrypted data in the second persistent storage unit.

In one embodiment, the second replication service unit may modify or adjust parts of the decrypted data. For instance, Uniform Resource Locators (URLs) may be adopted in order to be made specific to the secondary data center. Further, different merge strategies may be applied in order to import the different parts of the data. For example, the merge strategies may include overwriting target data by deleting existing entries or data, and adding the new ones. Also, merging the existing entries with the new data entries.

Figure 3:
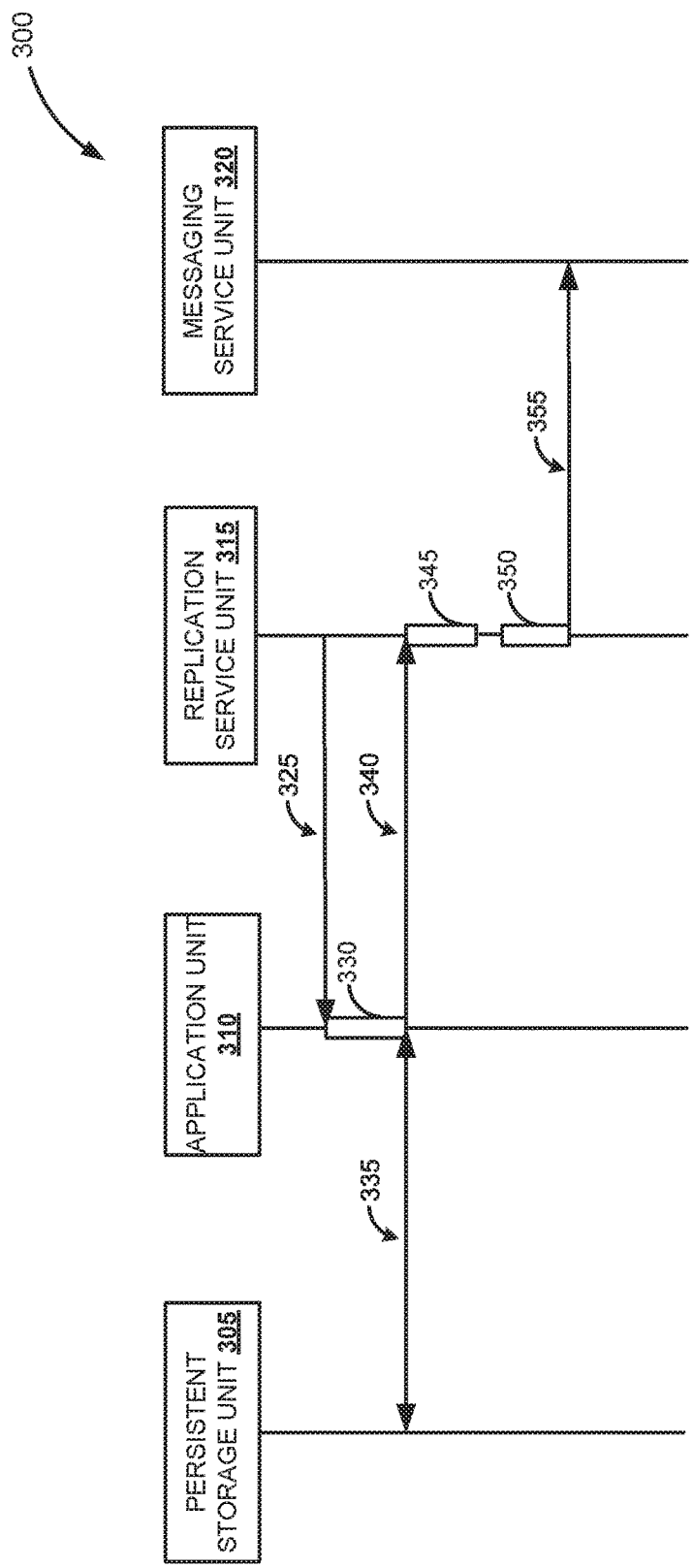
FIG. 3 is a sequence diagram illustrating an example data flow between a persistent storage unit, an application unit, a replication service unit and a messaging service unit associated with a primary data center, according to an embodiment.

FIG. 3 is a sequence diagram illustrating example data flow 300 between persistent storage unit 305, application unit 310, replication service unit 315 and messaging service unit 320 associated with a primary data center, according to an embodiment. The sequence diagram represents the interactions and the operations involved between the persistent storage unit 305, the application unit 310, the replication service unit 315 and the messaging service unit 320 of the primary data center. The vertical lines of the persistent storage unit 305, the application unit 310, the replication service unit 315 and the messaging service unit 320 represent the processes that may exist simultaneously. The horizontal arrows (e.g., 325, 335, 340 and 355) represent the process steps between the vertical lines representing their respective process objects (e.g., the persistent storage unit 305, the application unit 310, the replication service unit 315 and the messaging service unit 320). Activation boxes (e.g., 330, 345 and 350) between the horizontal arrows represent the processes performed in the respective process object.

At 315, the replication service unit 315 triggers the application unit 310 to retrieve data from the persistent storage unit 305 at regular time intervals. At 330, the application unit 310 determines any modification of the data in the persistent storage unit 305 from last time the application unit 310 has checked. Upon determining modification in the data, the application unit 310 retrieves the data from the persistent storage unit 305 at 335. Further at 340, the application unit 310 forwards the retrieved data to the replication service unit 315.

At 345, at least a part of the received data to be replicated is determined based on predetermined conditions. In one embodiment, determining the part of the received data includes filtering the received data based on the predetermined conditions. Further, the predetermined conditions define relevant data to be replicated. For example, the data specific to the primary data center (e.g., the data not relevant to other landscapes or data centers) and the data which can be restored (e.g., the data which can be rebuilt if required) are filtered out from replication. The data filtered for replication can be accounts data. For example, the accounts data can be applications in the accounts, component for the applications including domains, web context paths and URL prefixes, members of the account including their roles, tenants in the account, subscription between the tenants and the application in the account, and configuration data (destinations, key stores and passwords) on application, tenant or subscription level.

At 350, before transmitting the determined part of the data to a secondary data center, the determined part of the data is encrypted for security reasons. Therefore, the replication service unit in the primary data center filters, encrypts and sends the encrypted data through a message to the messaging service unit 320, at 355. Further, the messaging service unit 320 transmits messages containing the encrypted data to a secondary data center.

Figure 4:
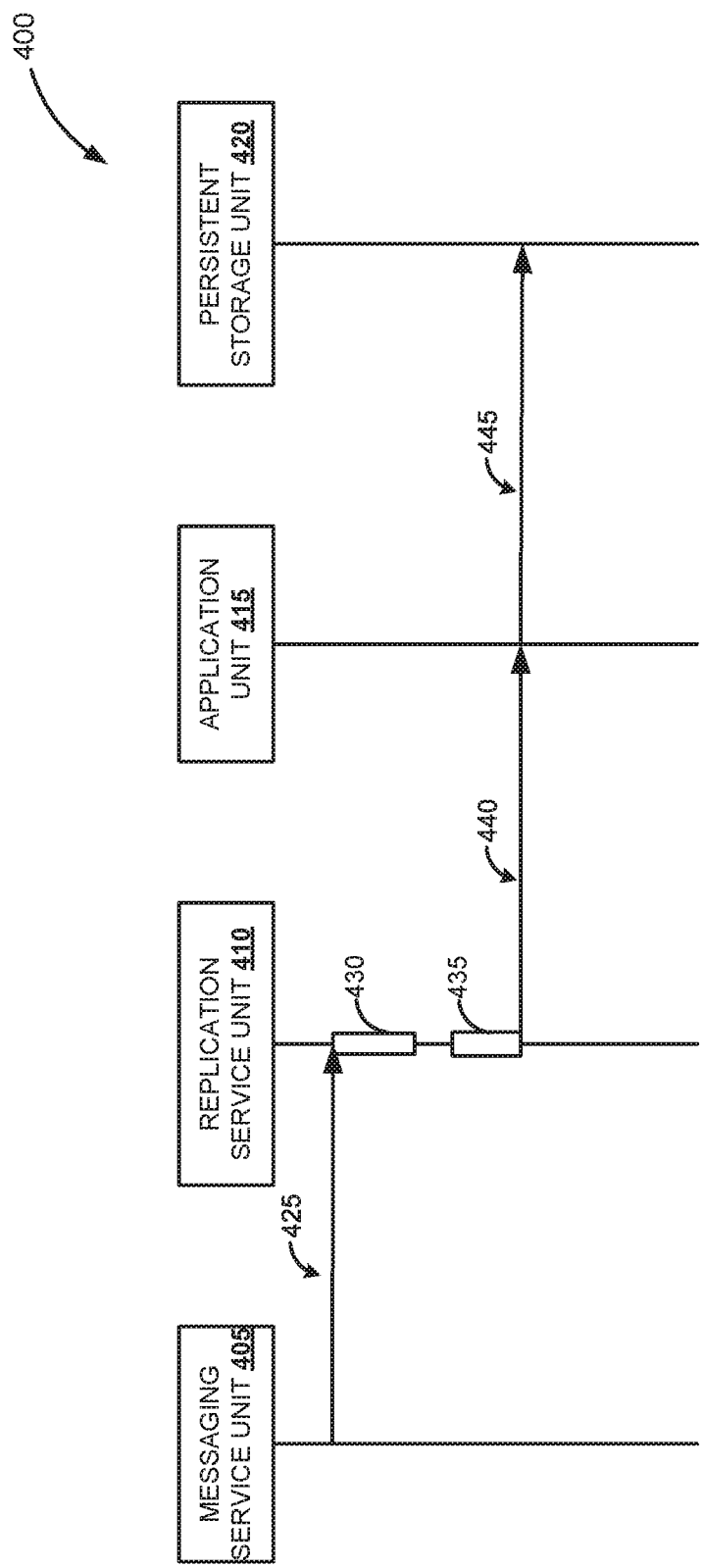
FIG. 4 is a sequence diagram illustrating an example data flow between a messaging service unit, a replication service unit, an application unit and a persistent storage unit associated with a secondary data center, according to an embodiment.

FIG. 4 is a sequence diagram illustrating example data flow 400 between messaging service unit 405, replication service unit 410, application unit 415 and persistent storage unit 420 associated with a secondary data center, according to an embodiment. The sequence diagram represents the interactions and the operations involved between the messaging service unit 405, the replication service unit 410, the application unit 415 and the persistent storage unit 420 of the secondary data center. The vertical lines of the messaging service unit 405, the replication service unit 410, the application unit 415 and the persistent storage unit 420 represent the processes that may exist simultaneously. The horizontal arrows (e.g., 425, 440 and 445) represent the process steps between the vertical lines representing their respective process objects (e.g., the messaging service unit 405, the replication service unit 410, the application unit 415 and the persistent storage unit 420). Activation boxes (e.g., 430 and 435) between the horizontal arrows represent the processes performed in the respective process object.

At 425, the message service unit 405 receives a message including encrypted data from a primary data center and transmits the message to the replication service unit 410. Further, the replication service unit 410 decrypts the encrypted data at 430. At 435, the replication service unit 410 may modify or adjust parts of the decrypted data. Further, different merge strategies may be applied in order to import the different parts of the data. Upon decrypting the encrypted part of the data and modifying the decrypted data, the decrypted part of the data is transmitted to the application unit 415 at 440. Further, the application unit 415 stores the data in the persistent storage unit 420 at 445. Also, the replication service unit 410 may modify the encrypted data specific to the secondary data center. For example, the data corresponding to accounts data, tenants and applications associated with an account can be imported by deleting or creating appropriate entries. The data relating to account members, member roles and URL prefixes for components, the entities are deleted in the persistent storage unit 420 and recreated. Configuration data (e.g., on tenant, application and subscription level) can be imported.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
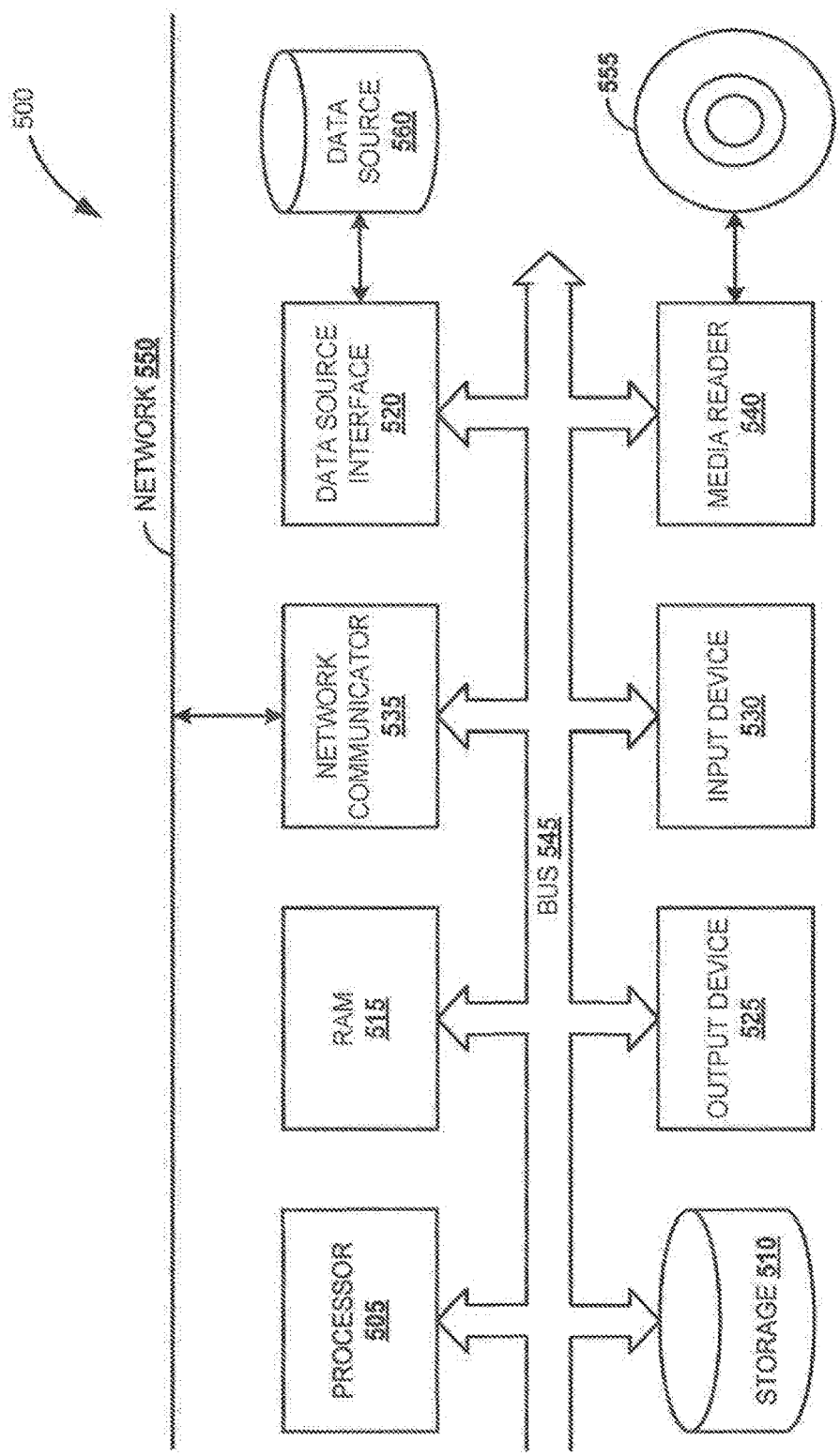
FIG. 5 is a block diagram illustrating an example computer system, according to an embodiment.

FIG. 5 is a block diagram of example computer system 500, according to an embodiment. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. One or more of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments, the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to:
   receive data from a first persistent storage unit associated with a primary data center, wherein receiving the data includes:
      determine a modification of the data in the first persistent storage unit at regular time intervals, and
      receive the data upon determining the modification of the data in the first persistent storage unit;
   determine at least a part of the received data to be replicated by filtering the data based on one or more predetermined conditions, wherein the one or more predetermined conditions define relevant data to be replicated and the one or more predetermined conditions comprise filtering out the data not relevant to other data centers and filtering out restorable data; and
   transmit the determined part of the data to replicate in a second persistent storage unit associated with a secondary data center to recover the part of the data during failure of the primary data center.

2. The non-transitory computer-readable medium of claim 1, wherein the secondary data center is in a different geographical location than the primary data center.

3. The non-transitory computer-readable medium of claim 1, wherein transmitting the determined part of the data comprises encrypting the determined part of the data before transmitting the determined part of the data.

4. The non-transitory computer-readable medium of claim 3, further comprising instructions, which when executed by the computer cause the computer to:
   receive the encrypted part of the data to be replicated at the secondary data center;
   decrypt the encrypted part of the data; and
   store the decrypted part of the data in the second persistent storage unit associated with the secondary data center.

5. The non-transitory computer-readable medium of claim 4, wherein decrypting the encrypted part of the data further comprises modifying the decrypted part of the data specific to the secondary data center.

6. A computer-implemented method to replicate data in a distributed environment, comprising:
   receiving the data from a first persistent storage unit associated with a primary data center, wherein receiving the data includes:
      determining a modification of the data in the first persistent storage unit at regular time intervals, and
      receiving the data upon determining the modification of the data in the first persistent storage unit;
   determining at least a part of the received data to be replicated by filtering the data based on one or more predetermined conditions, wherein the one or more predetermined conditions define relevant data to be replicated and the one or more predetermined conditions comprise filtering out the data not relevant to other data centers and filtering out restorable data; and
   transmitting the determined part of the data to replicate in a second persistent storage unit associated with a secondary data center to recover the part of the data during failure of the primary data center.

7. The computer-implemented method of claim 6, wherein the secondary data center is in a different geographical location than the primary data center.

8. The computer-implemented method of claim 6, wherein transmitting the determined part of the data comprises encrypting the determined part of the data before transmitting the determined part of the data.

9. The computer-implemented method of claim 8, further comprising:
   receiving the encrypted part of the data to be replicated at the secondary data center;
   decrypting the encrypted part of the data; and
   storing the decrypted part of the data in the second persistent storage unit associated with the secondary data center.

10. The computer-implemented method of claim 9, wherein decrypting the encrypted part of the data further comprises modifying the decrypted part of the data specific to the secondary data center.

11. A computing system, comprising:
   at least one processor; and
   one or more memory devices communicative with the at least one processor, wherein the one or more memory devices store instructions to:
      receive data from a first persistent storage unit associated with a primary data center, wherein receiving the data includes:
         determine a modification of the data in the first persistent storage unit at regular time intervals, and
         receive the data upon determining the modification of the data in the first persistent storage unit;
      determine at least a part of the received data to be replicated by filtering the data based on one or more predetermined conditions, wherein the one or more predetermined conditions define relevant data to be replicated and the one or more predetermined conditions comprise filtering out the data not relevant to other data centers and filtering out restorable data; and
      transmit the determined part of the data to replicate in a second persistent storage unit associated with a secondary data center to recover the part of the data during failure of the primary data center.

12. The computing system of claim 11, wherein the secondary data center is in a different geographical location than the primary data center.

13. The computing system of claim 11, wherein transmitting the determined part of the data comprises encrypting the determined part of the data before transmitting the determined part of the data.

14. The computing system of claim 13, further comprising instructions to:
   receive the encrypted part of the data to be replicated at the secondary data center;
   decrypt the encrypted part of the data; and
   store the decrypted part of the data in the second persistent storage unit associated with the secondary data center.

* * * * *